(12) United States Patent
Tsuda (10) Patent No.: US 8,289,419 B2
(45) Date of Patent: Oct. 16, 2012

(54) CONTROLLING OPTICAL ZOOMING AND ELECTRONIC ZOOMING OF AN IMAGING APPARATUS

(75) Inventor: Yuji Tsuda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 318 days.

(21) Appl. No.: 12/341,921

(22) Filed: Dec. 22, 2008

(65) Prior Publication Data

US 2009/0167899 A1   Jul. 2, 2009

(30) Foreign Application Priority Data

Dec. 27, 2007 (JP) ................................ 2007-336843

(51) Int. Cl.
*H04N 5/262* (2006.01)

(52) U.S. Cl. ............... 348/240.1; 348/240.2; 348/240.3; 348/240.99

(58) Field of Classification Search ............... 348/240.1, 348/240.2, 240.3, 240.99; 359/691
See application file for complete search history.

(56) References Cited

U.S. PATENT DOCUMENTS

| | | | |
|---|---|---|---|
| 5,990,947 A | | 11/1999 | Okino et al. |
| 6,650,368 B1 * | | 11/2003 | Doron .................. 348/240.2 |
| 7,417,673 B2 * | | 8/2008 | Wright et al. ........... 348/240.1 |
| 7,688,364 B2 * | | 3/2010 | LeGall et al. .......... 348/240.99 |
| 2001/0040630 A1 | | 11/2001 | Matsuzaka |
| 2004/0012695 A1 * | | 1/2004 | Itsukaichi .............. 348/240.1 |
| 2005/0046710 A1 * | | 3/2005 | Miyazaki ................. 348/239 |
| 2006/0171038 A1 * | | 8/2006 | Hung et al. .............. 359/691 |

FOREIGN PATENT DOCUMENTS

| | | |
|---|---|---|
| CN | 1933540 A | 3/2007 |
| EP | 1641247 A2 | 3/2006 |
| EP | 1670241 | 6/2006 |
| JP | 05-191701 | 7/1993 |
| JP | 2000-184259 | 6/2000 |
| JP | 2001-057649 | 2/2001 |
| WO | 97/13357 | 4/1997 |

* cited by examiner

*Primary Examiner* — Jason Chan
*Assistant Examiner* — Abdelaaziz Tissire
(74) *Attorney, Agent, or Firm* — Canon U.S.A., Inc. IP Division (57) ABSTRACT

An imaging apparatus includes an imaging unit configured to perform photoelectric conversion of an optical image, an optical zoom unit configured to perform optical magnification variation in response to a zooming operation, an electronic zoom unit configured to perform electronic magnification variation on a signal output from the imaging unit, and a controller configured to operate the electronic zoom unit together with the optical zoom unit in a first zoom range in response to the zooming operation, to operate the optical zoom unit without operating the electronic zoom unit in response to the zooming operation in a second zoom range, which is closer to a telephoto side than the first zoom range, and to operate the electronic zoom unit together with the optical zoom unit in response to the zooming operation in a third zoom range, which is closer to the telephoto side than the second zoom range.

4 Claims, 6 Drawing Sheets

CONTROLLING OPTICAL ZOOMING AND ELECTRONIC ZOOMING OF AN IMAGING APPARATUS

BACKGROUND OF THE INVENTION

1. Field of the Invention

The present invention relates to a technique for controlling optical zooming and electronic zooming of an imaging apparatus.

2. Description of the Related Art

Video cameras and digital cameras serving as imaging apparatuses are demanded to mount a high magnification zooming function to enable telephotography. To this end, various attempts have been made to achieve the high magnification zoom function by improving the performance of an optical zoom lens. However, generally, as the magnification of the optical zoom lens is increased, a lens system is increased in size and weight. In addition, the increase in size and weight tends to result in an increase in cost thereof. Thus, a method has been proposed, which achieves a high magnification by combining optical zoom for optically performing enlargement/reduction of an object image utilizing optical performance of a lens with electronic zoom for electronically performing enlargement/reduction of an image signal output from an image sensor.

For example, Japanese Patent Application Laid-Open No. 2000-184259 discusses the following method. That is, at a wide-angle end side, a zooming up operation is performed by increasing the magnification ratio of electronic zoom. When the magnification ratio reaches a certain value, optical zoom is started to move to a telephoto side to further perform a zooming up operation.

However, generally, in a case where images having the same number of pixels are generated, better image quality of the images is obtained by using more pixel-lines (hereunder sometimes referred to simply as lines) output from an image sensor. In view of this fact, technical ideas discussed in Japanese Patent Application Laid-Open No. 2000-184259 cause the following problem. That is, in a case where the optical zooming is used to perform zooming up, the number of lines to be extracted from the lines output from the image sensor satisfies the number of lines displayed in a monitor. However, then, the number of lines to be extracted therefrom becomes smaller. Therefore, the image quality of the image is degraded. This is because a zooming up operation is performed by increasing the magnification ratio of electronic zooming preferentially than the optical zooming up operation.

SUMMARY OF THE INVENTION

The present invention is directed to an imaging apparatus capable of realizing a higher magnification zooming operation using a combination of optical zooming and electronic zooming, and further capable of preventing degradation of image quality.

According to an aspect of the present invention, an imaging apparatus includes an imaging unit configured to perform photoelectric conversion of an optical image, an optical zoom unit configured to perform optical magnification variation in response to a zooming operation, an electronic zoom unit configured to perform electronic magnification variation on a signal output from the imaging unit, and a controller configured to operate the electronic zoom unit together with the optical zoom unit in a first zoom range in response to the zooming operation, to operate the optical zoom unit without operating the electronic zoom unit in response to the zooming operation in a second zoom range, which is closer to a telephoto side than the first zoom range, and to operate the electronic zoom unit together with the optical zoom unit in response to the zooming operation in a third zoom range, which is closer to the telephoto side than the second zoom range.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DETAILED DESCRIPTION OF THE EMBODIMENTS

Various exemplary embodiments, features, and aspects of the invention will be described in detail below with reference to the drawings.

In the following description, the term "optical zoom" means "to optically enlarge or reduce an object image utilizing the optical performance of a lens". Further, the term "electronic zoom" means "to enlarge or reduce an image by electronically enlarging or reducing an image signal that is output from an image sensor".

Figure 1:
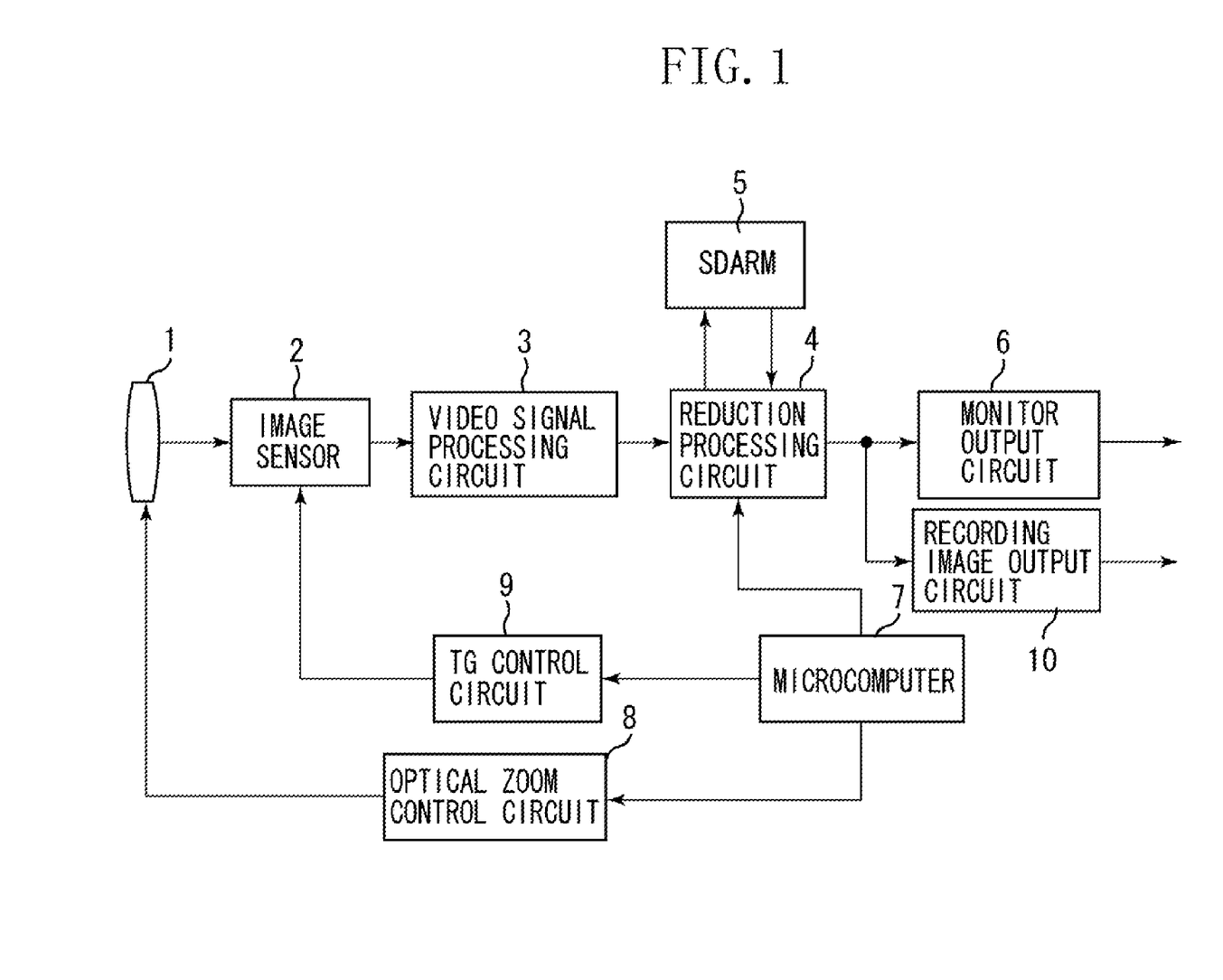
FIG. 1 is a block diagram illustrating a configuration of an imaging apparatus according to an exemplary embodiment of the present invention.

FIG. 1 is a block diagram illustrating an imaging apparatus according to an exemplary embodiment of the present invention. The imaging apparatus includes an optical zoom lens 1, an image sensor 2, a video signal processing circuit 3, a reduction processing circuit 4, and a synchronous dynamic random access memory (SDRAM) 5. The optical zoom lens serves as an imaging lens. The image sensor 2 (charge-coupled device (CCD) or a complementary metal-oxide semiconductor (CMOS)) converts (i.e., performs photoelectric conversion) an optical image, formed by the optical zoom lens 1, into an electric signal. The video signal processing circuit 3 performs video signal processing such that a signal output from the image sensor 2 conforms to a predetermined video standard. The reduction processing circuit 4 electronically performs reduction processing on the video signal. The synchronous dynamic random access memory (SDRAM) 5 temporarily saves video signal data when reduction processing is performed on a video signal. The imaging apparatus further includes a monitor output circuit 6 for outputting a video signal through an output terminal (not shown) to a monitor, a recording image output circuit 10 for outputting a video signal to be recorded on a recording medium, a timing generation (TG) control circuit 9 for generating horizontal and vertical driving signals for the image sensor 2, a microcomputer 7 serving as a control unit for controlling the entire system, and an optical zoom control circuit 8 for controlling a optical magnification variation operation (hereunder referred to also as optical zoom) using the optical zoom lens 1.

Hereinafter, an operation of changing an electronic zoom magnification according to an optical zoom magnification, in an imaging apparatus constructed as described above, is described.

An object image formed by the optical zoom lens 1 is converted into an electric signal by the image sensor 2. Then, the electric signal is input to the video signal processing circuit 3. In the video signal processing circuit 3, white balance processing for converting raw color into color close to memory color is performed on the electric signal. The video signal processing circuit 3 performs non-linear signal processing, such as gamma correction, or aperture correction processing for adding a perceived resolution. Then, the video signal processing circuit 3 outputs a video signal to the reduction processing circuit 4.

The TG control circuit 9 is configured to read data of, e.g., 2048 lines arranged in the vertical direction so as to read all effective pixels of the image sensor 2. Then, the reduction processing circuit 4 performs data extraction from the memory (hereunder sometimes referred to simply as memory-data extraction) to extract data of 480 lines from the data of 2048 lines as video signals so that the extracted data of 480 lines can be output as video signals. Subsequently, the reduction processing circuit 4 performs reduction processing on the extracted data of 480 lines. Then, the reduction processing circuit 4 outputs to the monitor output circuit 6 a digital video signal that has undergone the reduction processing. Subsequently, the monitor output circuit 6 converts the digital video signal into an analog signal and outputs it.

When zoom processing is performed in response to a photographer's zooming operation to zoom up an image signal output from the monitor output circuit 6, the microcomputer 7 outputs to the optical zoom control circuit 8 a control signal, which drives the optical zoom lens 1 toward the telephoto end. Concurrently with this, according to a zoom position of the optical zoom lens 1, the microcomputer 7 determines an extraction range. Then, the microcomputer 7 instructs a reduction ratio to the reduction processing circuit 4.

Figure 4:
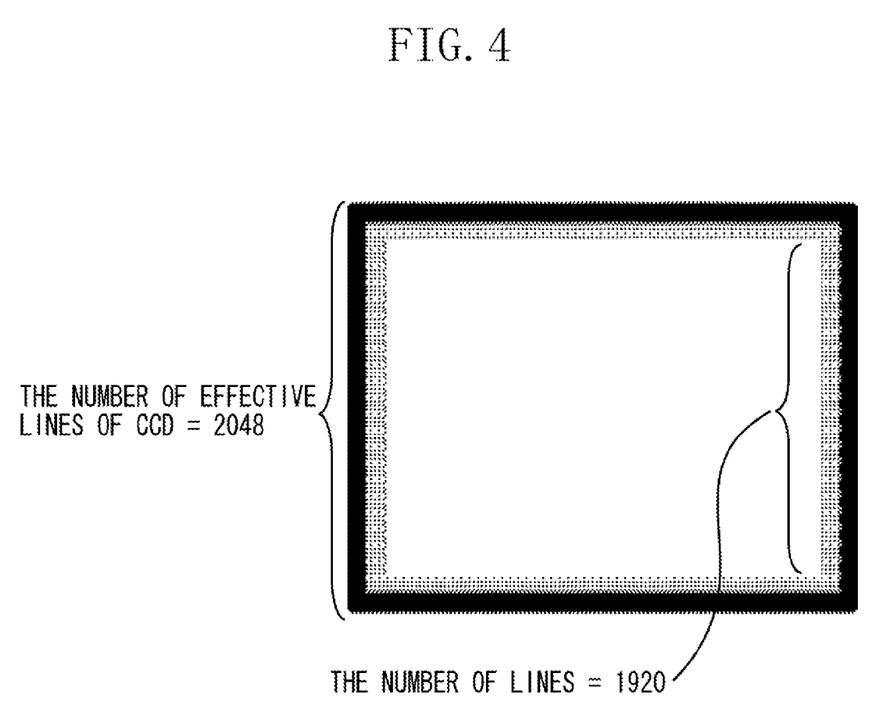
FIG. 4 is a diagram illustrating an operation of extracting a number of lines from an image stored in a memory of the imaging apparatus according to the exemplary embodiment of the present invention.

FIG. 4 illustrates a case, more specifically and schematically, where memory-data extraction is performed, in which video signals of 1920 lines are extracted from video signals of 2048 lines of all effective pixels of the image sensor 2. As is seen from FIG. 4, substantially all of the effective pixels of the image sensor 2 are extracted. Therefore, a wide-angle side imaging is performed.

Figure 5:
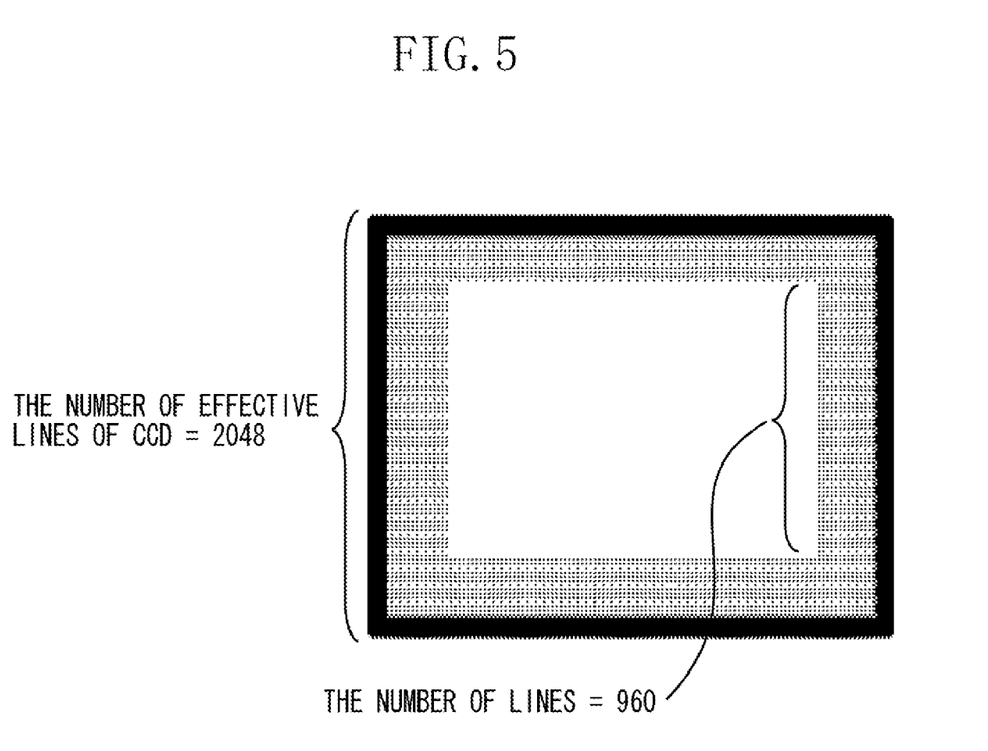
FIG. 5 is a diagram illustrating an operation of extracting another number of lines from the image stored in the memory of the imaging apparatus according to the exemplary embodiment of the present invention.

Next, FIG. 5 schematically illustrates a case where memory-data extraction is performed, in which video signals of 960 lines are extracted from the video signals of 2048 lines of all effective pixels of the image sensor 2. As is seen from comparison between FIGS. 4 and 5, video signals illustrated in FIG. 5 are extracted from an inner range of 2048 lines of all effective pixels of the image sensor 2.

Reasons, for which the number of lines to be extracted is set at 960, are described below. The number of such lines, i.e., 960, is an integral multiple of the number of lines, i.e., 480, of one frame image to be output to a monitor or to be recorded on a recording medium. That is, reduction processing is performed at a reduction ratio of 1/2 on an image having 960 lines to generate an image having 480 lines. At this reduction ratio, when one frame image having 480 lines is generated, as 960 is dividable by 480, interpolation processing between lines is not necessary. Thus, when a value of 960 is employed as the number of lines, the degradation of image quality is small. Consequently, the number of lines to be extracted is set to be 960. Accordingly, the number of lines to be extracted is set to be nX (n is an integer), because the value of nX is divisible by the number X of lines of a frame image to be recorded or displayed.

In addition, as memory-data extraction is performed by extracting video signals of 960 lines from those of 2048 lines, the remaining area of the image can be effectively used. More specifically, the remaining area can be used for electronic image stabilization, which reduces influence of image vibration due to camera shake or the like on a monitor output image and a recording image. On the other hand, when video signals of 1920 lines are extracted, as described above referring to FIG. 4, a region of effective pixels to be available for electronic image stabilization is smaller than the region when video signals of 960 lines are extracted. However, when video signals of 1920 lines are extracted, an imaging can be performed at a wider angle than at an angle when video signals of 960 lines are extracted. An influence of camera shake on an image captured at a wide-angle side is smaller than the influence of the camera shake on an image captured at a telephoto side. Accordingly, at a wide-angle side, a region of effective pixels, which is used for electronic image stabilization, can be reduced, as compared with the region used at a telephoto side.

Figure 6:
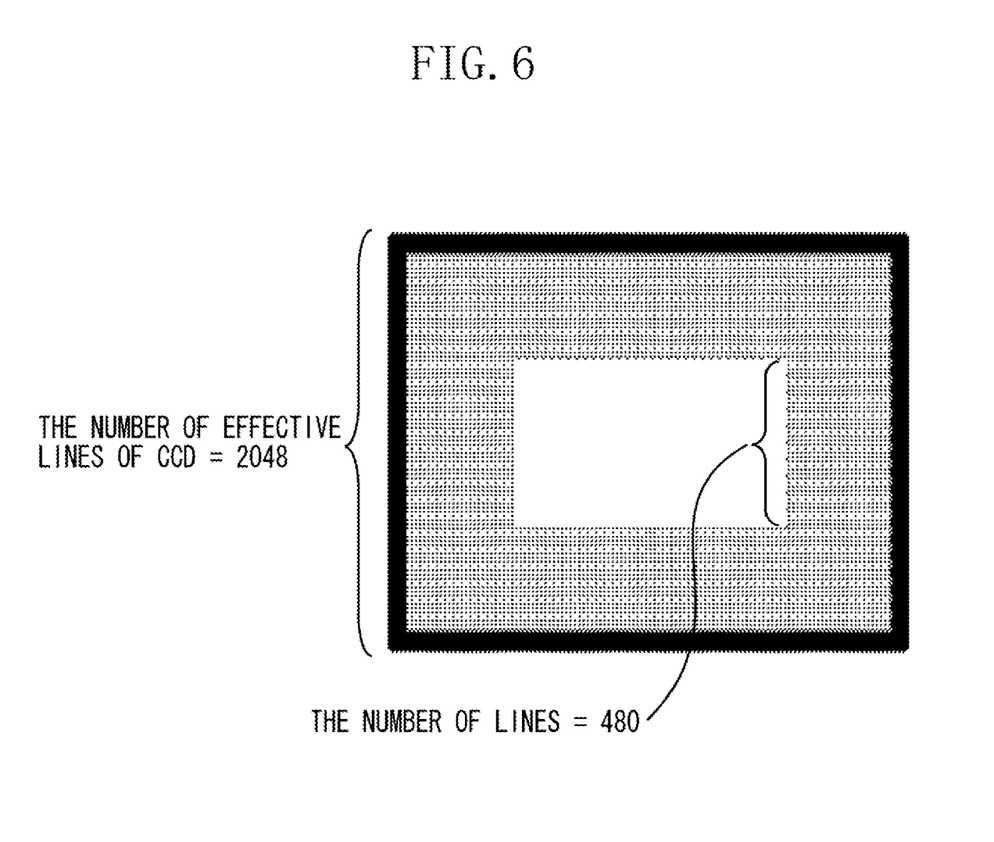
FIG. 6 is a diagram illustrating an operation of extracting still another number of lines from the image stored in the memory of the imaging apparatus according to the exemplary embodiment of the present invention.

FIG. 6 is a diagram schematically illustrating memory-data extraction for extracting video signals of 480 lines from those of all 2048 lines of effective pixels of the image sensor 2. As is seen from FIG. 6, video signals are extracted from a further inner range, than the range illustrated in FIG. 5, of all 2048 lines of effective pixels of the image sensor 2. The number of lines to be extracted is set at 480, because the number of lines to be output to a monitor and to be recorded on a recording medium is 480. In this case, interpolation processing on an image is not necessary, and thus, the degradation of image quality is small.

In addition, as described above, at a telephoto side, a region of effective pixels, which is available for electronic image stabilization, can be increased as compared with the region at a wide-angle side.

The electronic zoom for performing electronic magnification variation is performed in the above-described manner.

Figure 2:
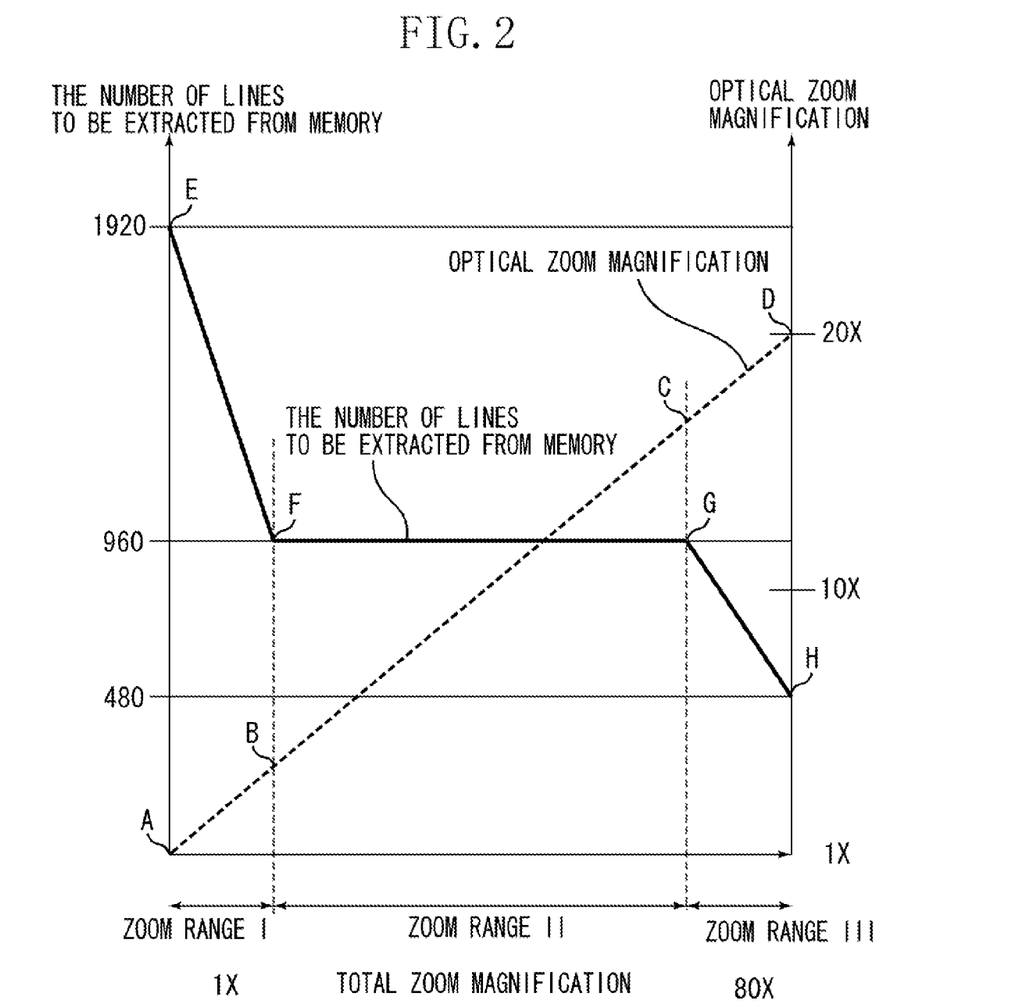
FIG. 2 is a diagram illustrating an operation of the imaging apparatus according to the exemplary embodiment of the present invention.

FIG. 2 illustrates an operation of the imaging apparatus according to the exemplary embodiment of the present invention. The right-side ordinate axis represents an optical zoom magnification. The optical zoom magnification indicated in FIG. 2 ranges from 1× to 20×. The left-side ordinate axis represents the number of lines to be extracted from the memory. The number of lines to be extracted from the memory ranges from 480 to 1920. The "number of lines to be extracted from the memory" determines the number of lines from which 480 lines are generated when signals of 2048 lines are input from the image sensor 2 to the signal processing circuit 3 to generate video signals of 480 lines. The maximum number of lines to be extracted from the memory is 1920, while the minimum number of lines to be extracted from the memory is 480. Thus, the magnification of the electronic zoom is 4×. Incidentally, the number of 480 corresponds to the number of lines included in one frame image to be output to a monitor or to be recorded on a recording medium.

In FIG. 2, the abscissa axis represents a total zoom magnification obtained by multiplying the optical zoom magnification by the electronic zoom magnification. More specifically, a maximum total zoom magnification of 80× is obtained by multiplying an optical zoom magnification of 20× by an electronic zoom magnification of 4×. In FIG. 2, a dashed line represents a process of changing the optical zoom magnification. A solid line represents a process of changing the number of lines to be extracted from the memory (the electronic zoom magnification is assumed to be 1× when the number of lines to be extracted from the memory is 1920).

Next, the process of changing the zoom magnification, which is controlled by the microcomputer 7, is described hereinafter referring to FIG. 2. For simplicity of description, only the process of changing the zoom magnification from a wide-angle side to a telephoto side in response to a photographer's zooming operation is described below. However, the process of changing the zoom magnification from the telephoto side to the wide-angle side can be performed similarly.

First, in a zoom range I, the optical zoom magnification is gradually increased from point A corresponding to the wide-angle end to point B at the telephoto side. Concurrently with this, the number of lines to be extracted from the memory is gradually reduced from point E corresponding to 1920 lines. Thus, in the zoom range I, an optical zoom unit and an electronic zoom unit are operated concurrently with each other.

In a zoom range II, the number of lines to be extracted from the memory is fixed at 960 while the optical zoom magnification is increased from a predetermined magnification corresponding to point B to another predetermined magnification corresponding to point C. Thus, in the zoom range II, only the optical zoom unit is operated without performing an operation of the electronic zoom unit.

The reasons, for which the number of lines to be extracted is set to be 960, have been described above. That is, because the number of lines to be output to the monitor is 480, an image having 480 lines to be output can be obtained by reducing the number of lines (i.e., 960) of an image, which is an integral multiple of (twice in this case) the number of lines to be output to the monitor (i.e., 480), to half. When the number of lines of an image to be output is reduced to just half, the signal processing circuit does not perform interpolation between lines. Thus, there is no degradation of image quality. In addition, a region of effective pixels, which is other than the 960 lines, is available for electronic image stabilization.

In a zoom range III, the optical zoom magnification is gradually increased from an optical zoom magnification corresponding to magnification point C to another optical zoom magnification corresponding to magnification point D at the telephoto side. Concurrently, the number of lines to be extracted from the memory is gradually reduced from 960 corresponding to magnification point G to 480 corresponding to magnification point H. Accordingly, in the zoom range III, the optical zoom unit and the electronic zoom unit are operated concurrently with each other.

Incidentally, reasons, for which the number of lines to be extracted is set at 480, are that the number of lines to be extracted is equal to that of lines to be output to the monitor or to be recorded on a recording medium, so that no degradation of image quality occurs, and a region of effective pixels, which is other than the 480 lines, is available for electronic image stabilization.

Note that the term "concurrently" means that an optical zoom operation and an electronic zoom operation are performed concurrently. That includes a case when the optical zoom operation and the electronic zoom operation are performed at a time and a case when they are performed alternately. Each case can occur depending on the load of the microcomputer 7 and/or the load of the optical zoom control circuit 8 when zooming is performed.

Figure 3:
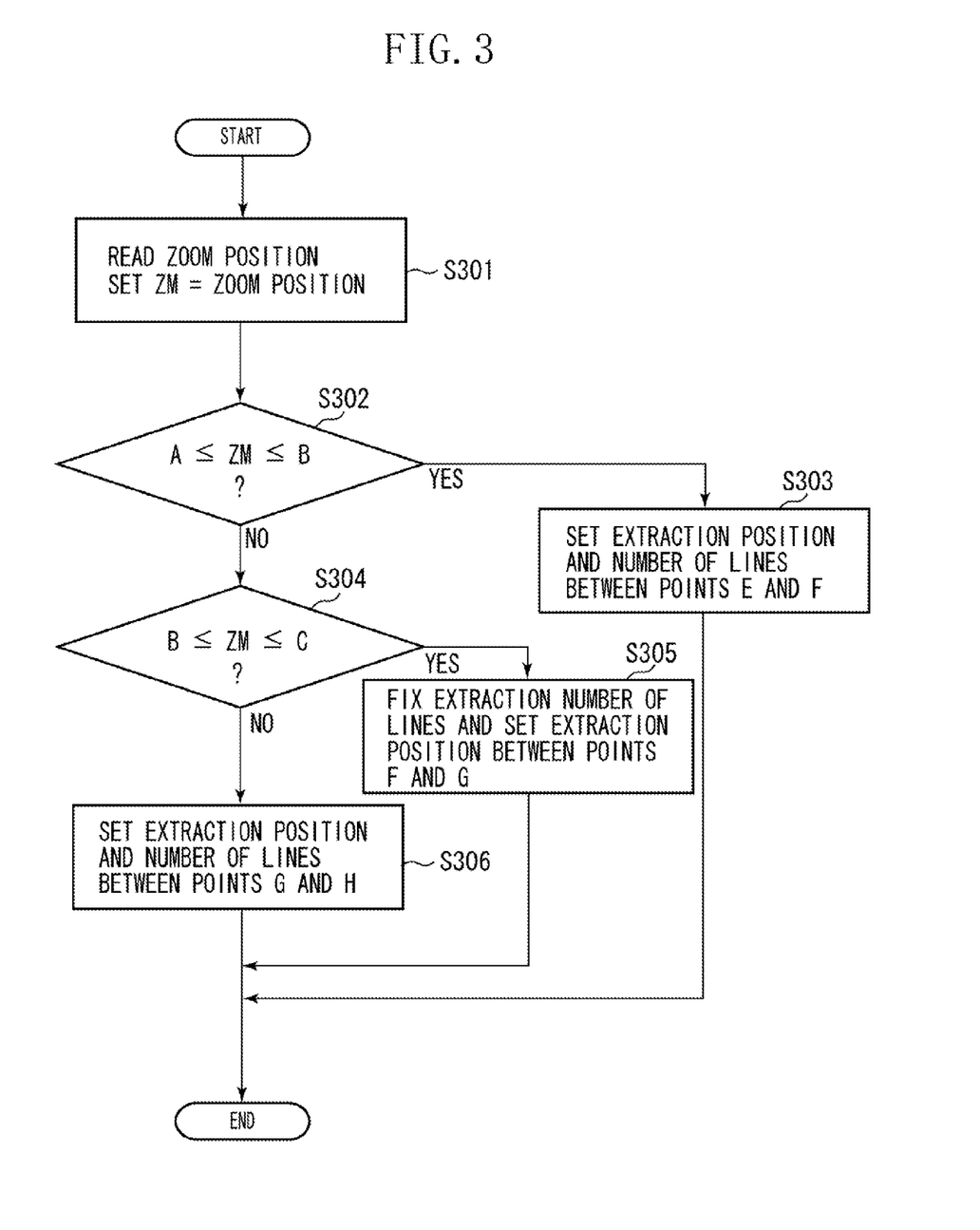
FIG. 3 is a flowchart illustrating the operation of the imaging apparatus according to the exemplary embodiment of the present invention.

FIG. 3 is a flowchart illustrating an operation of the microcomputer 7.

In step S301, the microcomputer 7 reads a zoom position of the optical zoom. In addition, the read zoom position is set to be ZM. In step S302, the microcomputer 7 determines whether the position ZM is located between points A and B (illustrated in FIG. 2). If the position ZM is located between points A and B (YES in step S302), the processing proceeds to step S303, in which the microcomputer 7 sets the number of lines to be extracted from the memory, and sets also extraction positions of the lines in the memory.

If the position ZM is not located between points A and B (NO in step S302), then in step S304, the microcomputer 7 determines whether the position ZM is located between points B and C. If the position ZM is located between points B and C (YES in step S304), then in step S305, the microcomputer 7 sets the extraction position in the memory while fixing the number of lines to be extracted from the memory. If the position ZM is not located between points B and C (NO in step S304), then in step S306, the microcomputer 7 sets the number of lines to be extracted from the memory and the extraction position in the memory according to the zoom position.

Incidentally, the extraction position in the memory is determined by considering the electronic image stabilization operation.

Thus, according to the present embodiment, in the zoom range I, the electronic zoom unit is operated together with the optical zoom unit in response to a photographer's zooming operation. Further, in the zoom range II, which is closer to the telephoto side than the zoom range I, the optical zoom unit is operated without operating the electronic zoom unit. Furthermore, in the zoom range III, which is closer to the telephoto side than the zoom range II, the electronic zoom unit is operated together with the optical zoom unit. Accordingly, wide-angle imaging can be performed at a wide-angle side of the zoom range using the effective pixel region of the image sensor 2 effectively. In an intermediate zoom range, the number of lines to be extracted from the memory at the electronic zooming is fixed. That is, the magnification ratio is fixed at a ratio at which good image quality is obtained. Further, in a zoom range at a telephoto side, the degradation of image quality of an image to be output to the monitor or to be recorded on a recording medium can be reduced as much as possible.

According to the present embodiment, when the zooming up by the optical zoom is performed, the number of lines to be extracted from lines output from the image sensor satisfies the number of lines to be displayed on the monitor. In addition, the degradation of the image quality due to a small number of the extracted lines can be reduced. Accordingly, high-magnification zooming can be realized by using the optical zoom unit and the electronic zoom unit, while the degradation of image quality can be reduced.

In the foregoing description, it has been described, as an example, the case where the number of lines to be output to the monitor or to be recorded on a recording medium is 480. However, technical ideas according to the present invention can be applied to a case where the number of lines to be output to the monitor or to be recorded on a recording medium is 1080.

Further, although the electronic zoom has been described by focusing on the number of lines to be extracted from the memory, signal processing in each line (extending in the horizontal direction), as viewed in FIGS. 4 through 6, is similarly performed. The present embodiment can be applied to the number of pixels corresponding to an output signal from the image sensor 2, the number of pixels to be output to the monitor, or the number of pixels to be recorded on a recording medium.

Furthermore, in the foregoing description, the apparatus has been described as a system in which the microcomputer 7 determines an extraction-data range of lines of pixels represented by signals output from the image sensor 2 according to the zoom position of the optical zoom lens 1. Regarding this respect, the apparatus can be modified such that the microcomputer 7 controls the zoom position of the optical zoom lens 1 in response to a photographer's zooming operation and determines a range of lines to be extracted from lines of pixels output from the image sensor 2 based on table data.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-336843 filed Dec. 27, 2007, which is hereby incorporated by reference herein in its entirety.

What is claimed is:

1. An imaging apparatus comprising:
   an imaging unit configured to perform photoelectric conversion of an optical image;
   an optical zoom unit configured to perform optical magnification variation in response to a zooming operation;
   an electronic zoom unit configured to perform electronic magnification variation on a signal output from the imaging unit; and
   a controller configured to operate the electronic zoom unit together with the optical zoom unit in a first zoom range in response to the zooming operation, to operate the optical zoom unit without operating the electronic zoom unit in response to the zooming operation in a second zoom range, which is closer to a telephoto side than the first zoom range, and to operate the electronic zoom unit together with the optical zoom unit in response to the zooming operation in a third zoom range, which is closer to the telephoto side than the second zoom range;
   wherein the controller performs an electronic image stabilization to reduce image vibration using a number of pixels of an image corresponding to signal output from the imaging unit.

2. The imaging apparatus according to claim 1, wherein the controller operates the electronic zoom unit such that a number of pixels corresponding to signals output from the imaging unit in the first zoom range is larger than at least one of a number of pixels output to a monitor and a number of pixels to be recorded on a recording medium.

3. The imaging apparatus according to claim 1, wherein the controller operates the electronic zoom unit such that a number of pixels corresponding to signals output from the imaging unit in the second zoom range is an integral multiple of at least one of a number of pixels output to a monitor and a number of pixels to be recorded on a recording medium.

4. A method for controlling an imaging apparatus including an imaging unit configured to perform photoelectric conversion of an optical image, an optical zoom unit configured to perform optical magnification variation in response to a zooming operation, and an electronic zoom unit configured to perform electronic magnification variation on a signal output from the imaging unit, the method comprising:
   operating the electronic zoom unit together with the optical zoom unit in a first zoom range in response to the zooming operation;
   operating the optical zoom unit without operating the electronic zoom unit in response to the zooming operation in a second zoom range, which is closer to a telephoto side than the first zoom range;
   operating the electronic zoom unit together with the optical zoom unit in response to the zooming operation in a third zoom range, which is closer to the telephoto side than the second zoom range; and
   performing an electronic image stabilization to reduce image vibration using a number of pixels of an image corresponding to signal output from the imaging unit.

* * * * *